Oct. 9, 1956 — E. G. PICKELS ET AL — 2,765,665
HIGH SPEED DRIVING MECHANISM
Filed Dec. 20, 1954 — 2 Sheets-Sheet 1
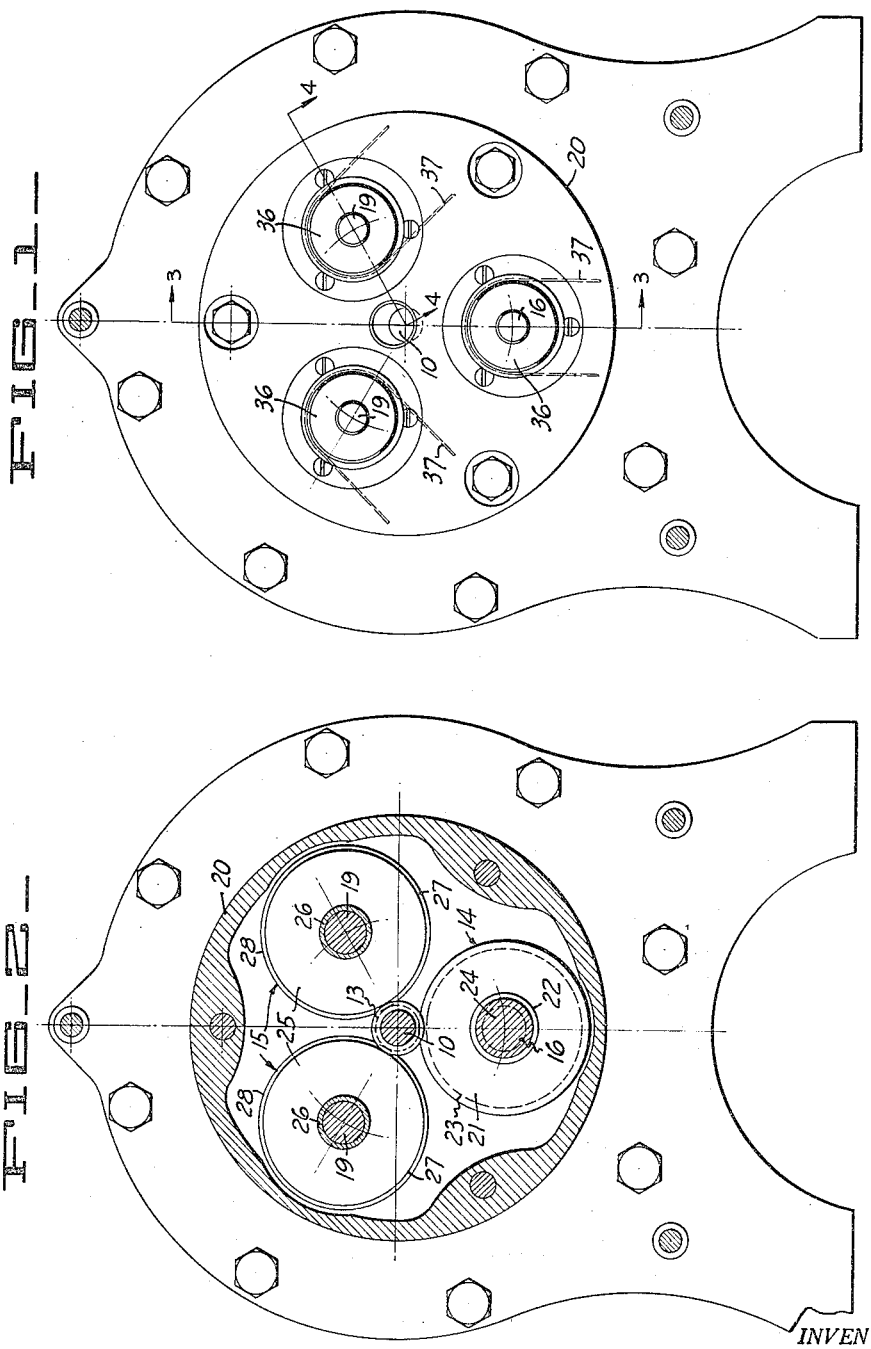

Oct. 9, 1956
E. G. PICKELS ET AL
2,765,665
HIGH SPEED DRIVING MECHANISM
Filed Dec. 20, 1954
2 Sheets-Sheet 2
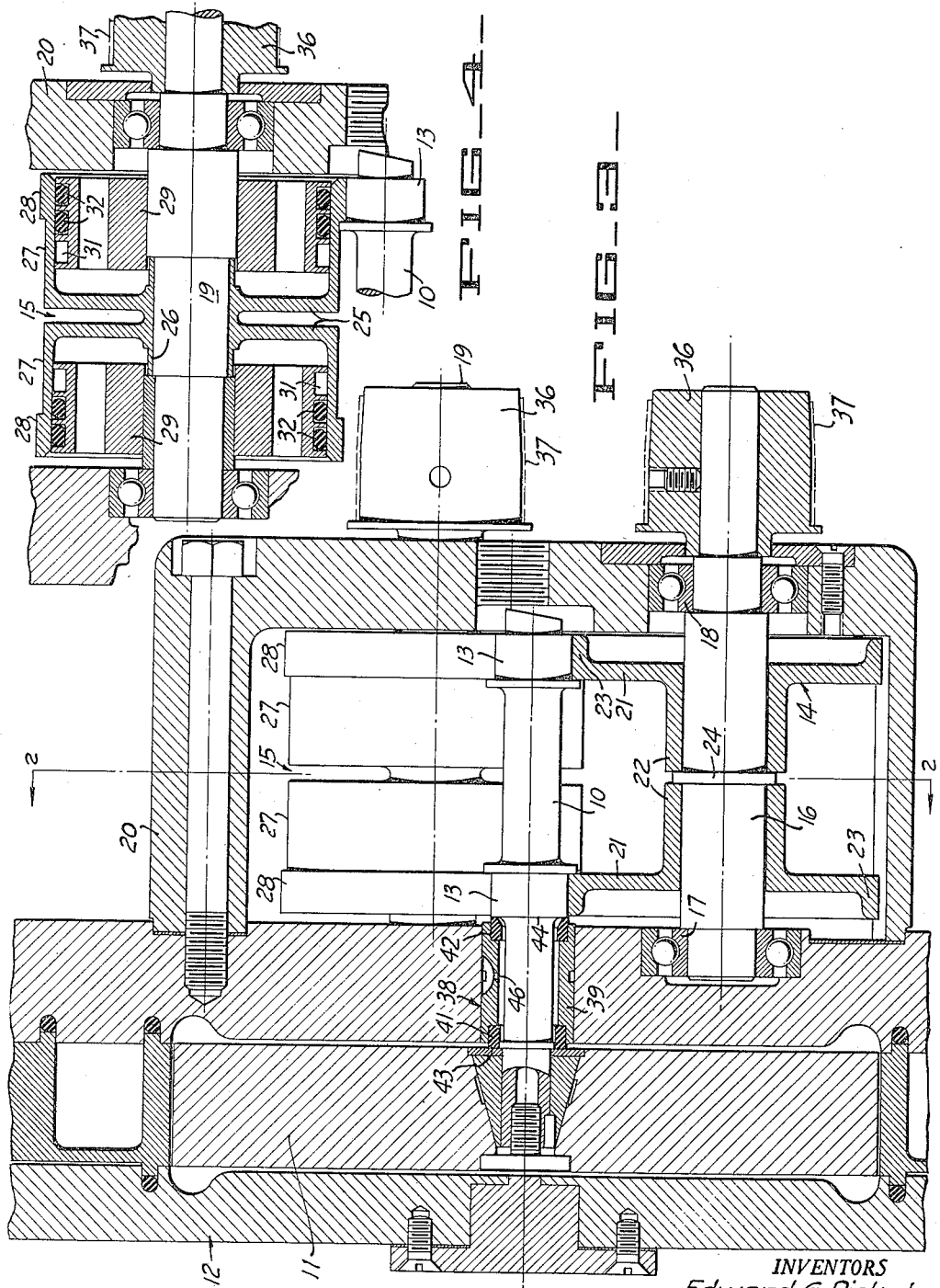
INVENTORS
Edward G. Pickels
Philip F. Scofield
BY
ATTORNEYS.

United States Patent Office 2,765,665
Patented Oct. 9, 1956

2,765,665

HIGH SPEED DRIVING MECHANISM

Edward G. Pickels and Philip F. Scofield, Atherton, Calif., assignors, by mesne assignments, to Beckman Instruments, Inc., Fullerton, Calif., a corporation of California Application December 20, 1954, Serial No. 476,273

6 Claims. (Cl. 74—206)

This invention relates generally to a mechanism for driving rotary members at relatively high speeds, as for example, speeds of the order of 100,000 to 200,000 R. P. M. or more.

Rotative speeds of the order mentioned above involve special problems which are not encountered at lower and more conventional speeds. Assuming that the member to be rotated is mounted on a shaft or spindle, with the shaft being carried by ball bearings or like journals, and driven with conventional speed multiplying gearing, the shaft and the associated parts of the gearing are subject to serious vibration at various critical speeds, thus subjecting the arrangement to excessive friction and wear and in many instances making the operation hazardous due to possible breakage. Also conventional bearing assemblies of the ball bearing type are subject to mechanical failure at high rotative speeds. These difficulties have handicapped the design and construction of certain instruments and machines, where high speeds of rotation may be desirable or essential.

In general it is an object of the present invention to provide a high speed driving means capable of overcoming the difficulties pointed out above.

Another object of the invention is to provide mechanism of the above character which will provide means for preventing vibrational effects at critical speeds.

Another object of the invention is to provide mechanism of the above character which is relatively simple in construction and design, and which is suitable for use in many types of instruments and machines where high rotative speeds are desired.

Further objects of the invention will appear from the following description in which the preferred embodiment of the invention has been set forth in detail in conjunction with the accompanying drawing.

Referring to the drawing:

Figure 1 is an end view of a drive mechanism incorporating the invention.

Figure 2 is a cross-sectional view on a reduced scale taken along the line 2—2 of Figure 3.

Figure 3 is a cross-sectional view on an enlarged scale taken along the line 3—3 of Figure 1.

Figure 4 is a cross-sectional detail illustrating the construction of one of the drive rollers.

In the embodiment of the invention disclosed herein we provide a main shaft 10 which has its one end attached to the rotary member 11 of some device, such as a grinding mill 12. Machined annular surfaces 13 are formed on thte shaft and are adapted to be engaged by driving rollers. Three driving rollers 14 and 15 are employed in this particular instance. The roller 14 is carried by the shaft 16, which is carried by suitable journal means such as the ball bearing assemblies 17 and 18. The shafts 19 serve to mount the rollers 15, and are similarly journaled. The shaft 10 and the driving rollers can be enclosed with a suitable housing 20, which also serves to mount the bearing assemblies 17 and 18.

The roller 14 consists in this instance of the annular members 21, which have hubs 22, and which provide annular portions 23 having their peripheries machined to contact the surfaces 13 on the main shaft. The hubs 22 are fixed to the shaft 16 on opposite sides of the spacing collar 24. A roller of this type is relatively rigid. In other words no substantial amount of deflection is provided when forces are applied in a radial direction to the peripheries of the portions 23.

The rollers 15 are constructed in such a manner as to incorporate vibration damping means. In the construction illustrated in Figure 4 each roller consists of two bell-shaped members 25, which are disposed back to back and carried by a hub 26 that is fixed to the shaft 19. The rim 27 of each member 25 has a marginal portion 28 which is machined to provide a peripheral surface for contacting with the surfaces 13 on the main shaft 10. Members 25 are made of suitable metal or metal alloy which will provide a desired amount of "spring" or "give," without metal fatigue.

Within each member 25 dampening means is provided which extends in vibration darmping relation with the rim 27. The means employed in this instance consists of a rigid annular member 29 which is fixed to the shaft 19, and which is machined to provide a small clearance between its outer periphery and the inner periphery of the associated rim 27. For example, in one particular instance the outer diameter of member 29 was 2.339 inches, and the internal diameter of rim 27 was 2.345 inches.

The periphery of each member 29 is machined to provide one or more grooves 31, which accommodate the resilient damping rings 32. The rings 32 are made of suitable resilient or elastic material, such as natural or synthetic rubber, or like elasticon, and before introduction into the assembly, they can be circular in section, or in other words they can be what is commonly referred to as a resilient rubber O-ring. The dimensioning is such that in the final assembly the resilient rings are compressed a substantial amount in a radial direction. The distance between the axis of shaft 10, and each of the shafts 19, is such that in the region where each bell-shaped member 25 contacts the shaft 10, the rim 27 is sprung or deflected radially a small amount.

Suitable means is provided for driving the shafts 16 and 19. Thus exterior of the housing 20, the shafts are provided with the pulley wheels 36 that are engaged by the driving belts 37. These belts engage driving pulleys on suitable motive means, such as separate electrical motors (not shown).

Assuming that the shaft 10 is attached to the rotor of a grinding mill, it is desirable to provide a dust seal 38. The particular seal illustrated includes a bushing 39, which carries the seal rings 41 and 42. The rings can be made of suitable material such as Teflon or nylon, and have their ends in contact with the surfaces 43 and 44, on the rotor 11 and the shaft 10 respectively. A passage 46 extends through the interior of the bushing 39, and connects with a suitable source of air or other gas under pressure.

Operation of the mechanism described above is as follows: By virtue of the engagement of shaft portions 13 with the peripheral surfaces of the rollers 14 and 15, the shaft 10 is supported in a desired axial alignment. There is sufficient pressure between all of the peripheral surfaces in contact to establish good frictional driving relationship. As driving torque is applied to the pulleys 36, the rollers serve to drive the shaft 10 with the desired speed multiplication. As the speed increases the mechanism may pass through critical speeds where there is a tendenecy toward mechanical vibration. Such vibrations are damped out by damping means associated with the pulleys 15, whereby rotative speeds of the order of from 100,000 to 200,000 R. P. M. or more can be attained without detrimental vibration. Due to the elimination of vibrational effects, the mechanism can be used for such high rotative speeds without undue friction or wear, and without the hazard of possible breakage.

We claim:

1. In a high speed driving mechanism, a main shaft adapted to be rotated, at least three rollers and secondary driving shafts serving to mount the rollers, the secondary shafts being disposed in circumferentially spaced positions about the main shaft with their axes parallel to the axis of the main shaft and with the peripheries of the rollers in frictional driving relation with the periphery of the main shaft, at least one of said rollers comprising a bell-like member, the rim of said member having a surface thereon adapted to be in frictional contact with the periphery of the main shaft, the engagement of the rollers with the main shaft serving to maintain the shaft in a desired axial alignment.

2. In a high speed driving mechanism, a main shaft adapted to be rotated, at least three rollers, secondary shafts serving to mount the rollers, the shafts being disposed in circumferentially spaced positions about the main shaft with their axes parallel to the axis of the main shaft and with their peripheries in frictional driving relation with the periphery of the main shaft, at least one of said rollers comprising a bell-like member, the rim of said member having a surface thereon adapted to be in frictional contact with the periphery of the main shaft, and means disposed within said member to dampen vibrations of the same, the engagement of the rollers with the main shaft serving to maintain the main shaft in a desired axial alignment.

3. In a high speed driving mechanism, a main shaft adapted to be rotated, at least three rollers, secondary shafts serving to mount the rollers, the shafts being disposed in circumferentially spaced positions about the main shaft with their axes parallel to the axis of the main shaft and with their peripheries in frictional driving relationship with the peripheries of the main shaft, at least one of said rollers comprising a pair of bell-like members, said members being disposed back to back, each of said members having an annular surface formed thereon adapted to have frictional engagement with the peripheries of the main shaft, and vibration dampening means disposed within each of said members, the engagement of the rollers with the main shaft serving to maintain the main shaft in a desired axial alignment.

4. In a high speed driving mechanism, a main shaft adapted to be rotated, at least three rollers, secondary shafts serving to mount the rollers, the secondary shafts being disposed in circumferentially spaced positions about the main shaft with their axes parallel to the axis of the main shaft and with the peripheries of the rollers in frictional driving relation with the periphery of the main shaft, means for journaling the secondary shafts, at least one of said rollers being rigid and at least two of said rollers including bell-like resilient members, the rim of said members having a surface thereon adapted to be in frictional contact with the main shaft, and damping means associated with said resilient members.

5. In a high speed driving mechanism, a main shaft adapted to be rotated, at least three rollers, secondary shafts serving to mount the rollers, the secondary shafts being disposed in circumferentially spaced positions about the main shaft with their axes parallel to the axis of the main shaft and with the peripheries of the rollers in frictional driving relation with the peripheries of the main shaft, each of said rollers having two axially spaced annular surfaces thereon which are in frictional driving contact with two annularly spaced portions of the main shaft, at least two of said rollers each comprising a pair of bell-shaped shells disposed back to back, the marginal edges of the flanges of said shells forming said annular surfaces, the flanges of said shells being radially resilient, and vibration damping means disposed within each of said shells.

6. A driving mechanism as in claim 5 in which said vibration damping means comprises a substantially rigid annular member disposed within the shell, and an annular member of elastic material interposed between the inner periphery of the shell and said inner member, said last named member being radially compressed.

References Cited in the file of this patent

UNITED STATES PATENTS

| 1,093,922 | Dieterich | Apr. 21, 1914 |
| 1,704,205 | Oakes et al. | Mar. 5, 1929 |

FOREIGN PATENTS

| 910,013 | Germany | Apr. 26, 1954 |